July 5, 1960 E. O. KEIZER ET AL 2,944,205

FREQUENCY DIVIDER

Filed Dec. 27, 1956 2 Sheets-Sheet 1

INVENTORS
EUGENE O. KEIZER &
ROBERT F. SANFORD

BY Charles H. Brown
ATTORNEY

INVENTORS
EUGENE O. KEIZER &
ROBERT F. SANFORD
BY Charles H. Brown
ATTORNEY

United States Patent Office 2,944,205

Patented July 5, 1960

2,944,205

FREQUENCY DIVIDER

Eugene O. Keizer, Princeton, and Robert F. Sanford, Cranbury, N.J., assignors to Radio Corporation of America, a corporation of Delaware Filed Dec. 27, 1956, Ser. No. 630,876

18 Claims. (Cl. 321—69)

The invention relates to frequency dividers, and has for an object to provide an improved frequency divider which produces signals having a frequency lower than the frequency of external signals applied to the frequency divider.

In accordance with one embodiment of the invention, there is employed a series circuit capable of passing direct current and which includes a junction diode, an inductor, a parallel circuit comprising a capacitor and a resistor or comprising a capacitor and an inductor, and a source of alternating current signals. This source furnishes signals having an amplitude sufficient to provide output oscillations of a frequency lower than the frequency of the source signals. These output oscillations may be derived from the capacitor, and may have a frequency which is any fractional part of the frequency of the source signals, and may be locked to maintain this fractional frequency.

In accordance with another embodiment of the invention, there is employed a series circuit capable of passing direct current and which includes a junction diode and two inductors. The same source of alternating current signals mentioned above is coupled to one of the inductors so that the source is effectively in series with the series circuit. Output oscillations of a frequency lower than the frequency of the source signals are derived from a resonant circuit coupled to the other of the inductors. These output oscillations may have a frequency which is any fractional part of the frequency of the source signals, and may be locked to maintain this frequency.

The invention is explained in detail in connection with the accompanying drawing. In order that the invention may be better understood, a theoretical explanation will be given. It is to be understood, however, that this theoretical explanation is given only in order that the invention may be better understood and appreciated, and while such explanation is believed to be correct, it is not of necessity complete, nor does the successful operation of the invention depend upon the accuracy of this theoretical explanation.

Figures 1, 2, 3, 4:
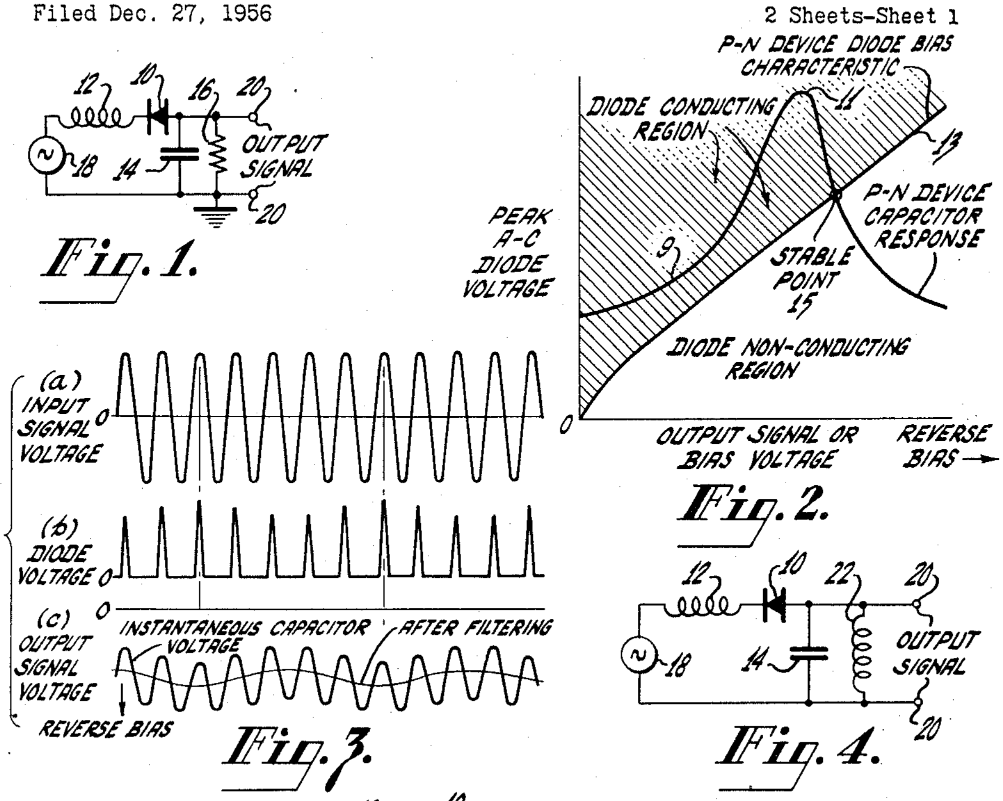
Fig. 1 shows a circuit diagram of one embodiment of the invention.
Figs. 2 and 3 show curves and waveforms, respectively, which are given in order that the theoretical explanation of the invention may be better understood.
Figs. 4 thru 8 show circuit diagrams of other embodiments of the invention.

Fig. 1 illustrates the circuit diagram of one embodiment of the frequency divider in accordance with the invention. Basically, the frequency divider includes a junction diode or device 10 which is connected in series with an inductor 12. This device 10 may be a variable-capacitance germanium junction diode, such as the type described beginning at page 221 of "Transistors I", published by RCA Laboratories, Princeton, N.J., in March 1956, and which has, in addition to its diode rectifying characteristics or properties, capacitive characteristics or properties which can be varied by a bias or instantaneous voltage. The device 10 may be considered as having a capacity which is electrically in parallel with the diode portion of the device 10. Furthermore, this capacity varies in accordance with the amount of voltage which is present across the terminals of the device 10. Consequently, the device 10 is schematically shown as a capacitor and a diode connected as a unit in parallel. One end of a parallel circuit comprising a capacitor 14 and a resistor 16 is connected to one end of the series circuit comprising the inductor 12 and the device 10. A source 18 that provides alternating current signals is connected between the other end of the parallel circuit and the other end of the series circuit to form a complete frequency divider in accordance with the invention. In the circuit of Fig. 1, the complete frequency divider circuit including the source 18 provides a path that permits direct current to flow. For reasons that will be explained, the source 18 must produce signals having an amplitude that is sufficient to sustain the output oscillations of lower frequency than the applied signals. The various elements of the series circuit may be altered in the frequency divider circuit. For example, the parallel circuit and the inductor 12 can be interchanged in location, or the device 10 can be interchanged in position with the source 18, or as another alternative the device 10 can be located in the lower connection between the source 18 and the parallel circuit. Output oscillations having a frequency that is lower than the frequency of the applied signals may be derived from a pair of output terminals 20 which are connected across the capacitor 14 and the resistor 16. The complete frequency divider may be connected to a point of reference potential or ground at any desired point, such as at the junction of the parallel circuit and the source 18 as shown in the circuit diagram of Fig. 1.

During the time the source 18 produces an alternating current input signal having an amplitude sufficient to sustain lower frequency output oscillations, the device 10 is alternately conducting and non-conducting. Each time that the device 10 conducts, the capacitor 14 receives a charge, the amount of the charge depending, among other things, upon the magnitude of the capacitor 14 and the amount of charge already on the capacitor 14. Eventually, the capacitor 14 is charged to an ultimate value about which its charge then varies or oscillates at a frequency that is lower than the frequency of the signals from the source 18. Again, the amount of this ultimate value of charge will depend, among other things, upon the magnitudes of the capacitor 14 and the resistor 16. The amount of capacity exhibited by the device 10 depends upon the bias voltage across the terminals of the device 10. And, the amount of bias voltage present across the terminals of the device 10 depends upon the amount of charge on the capacitor 14. Since the device 10 is connected in series with the inductor 12, the capacity exhibited by the device 10 forms a series resonant circuit with the inductor 12 in the complete circuit of the frequency divider. As is known, when a signal of given frequency is applied to a series resonant circuit, the peak voltage which exists across the capacitor of such a series resonant circuit depends upon the size of the capacitor. The greatest voltage is developed across the capacitor when its capacity is the magnitude needed to resonate with the inductor in the series resonant circuit for the particular frequency of the signal which is applied to the series resonant circuit. During the time when the device 10 is non-conducting, a voltage is developed across the device 10 so that the capacity exhibited by the device 10 is effectively in series with the inductor 12. And as previously mentioned, the amount of capacity which the device 10 exhibits is determined by the amount of bias voltage across the terminals of the device 10.

The change in peak voltage present across the terminals of the device 10, resulting from the change in capacity with respect to bias voltage, is shown by the capacitor response curve 9 in Fig. 2. In Fig. 2, the curve 9 shows that the peak voltage across the terminals of the device 10, starts at some value when the bias voltage across the device 10 is zero. As the bias voltage increases toward the right, that is, in the direction of reverse bias or less diode conduction, the peak voltage across the device 10 also increases, and reaches a point 11 at that value of bias voltage at which the capacity exhibited by the device 10 resonates with the inductor 12 at the frequency of the applied signal. The peak voltage then diminishes or falls toward zero again as the bias voltage is increased still farther in the direction of reverse bias. It should be understood, of course, that this peak voltage would be developed across the terminals of the device 10 when only the capacity exhibited by the device 10 is taken into consideration, and the conduction characteristic of the device 10 is not present. The operation of the device 10 is shown by the diode characteristic curve 13 in Fig. 2. The diode characteristic curve 13 shows the amount of peak voltage needed across the terminals of the device 10, as a function of the bias voltage across the terminals of the device 10, so as to render the device 10 conductive. This diode characteristic curve 13 starts at zero and rises as the bias voltage is increased in the direction of reverse bias or less diode conduction. Thus, when the bias voltage across the terminals of the device 10 is increased in the direction of reverse bias, a greater peak voltage is needed across device 10 in order for the device 10 to conduct. The conducting and non-conducting regions of the device 10 are also indicated in Fig. 2.

When the source 18 produces an alternating current input signal having an amplitude sufficient to sustain low frequency oscillations, the frequency divider circuit shown in Fig. 1 will eventually reach the condition where the bias voltage present across the capacitor 14 reaches an ultimate value about which it oscillates. Again, as stated hereinbefore, the amount of this ultimate bias voltage depends, among other things, upon the size of the capacitor 14 and the size of the resistor 16. The amount of ultimate bias voltage also depends upon the magnitude of the current thru the device 10 each time the input signal is sufficient to overcome the bias voltage on the device 10. Thus, with reference to Fig. 2, the ultimate bias voltage across the capacitor 14 will oscillate about a stable point 15 indicated in Fig. 2. The position of this stable point 15 with relation to the bias voltage depends upon the amplitude of the input signal from the source 18. The bias voltage then oscillates or varies about the bias voltage corresponding to the stable point 15 at a rate dependent, among other things, upon the values of the capacitor 14 and the resistor 16. This oscillation may be explained if, at first, it be assumed that the bias voltage increases in the direction of reverse bias or less diode conduction. The device 10 is then non-conductive for a greater length of time than before the increase in the direction of reverse bias, and this condition permits the capacitor 14 to discharge some slight amount thru the resistor 16 during the non-conduction interval, and to decrease the bias voltage in the direction of forward bias or greater diode conduction. When the bias voltage decreases to the left, that is, in the direction of forward bias, the device 10 is then conductive for a greater length of time, and this condition permits the capacitor 14 to receive an additional charge and to increase the bias voltage in the direction of reverse bias again. Thus the capacitor 14 is alternately charged and discharged at a rate dependent, among other things, upon the value or magnitude of the capacitor 14 and the resistor 16. This rate of charge and discharge is, of course, less than the frequency of the input signal. And, it is this alternate charge and discharge of the capacitor 14 which provides output oscillations having a frequency that is less than the frequency of the input oscillations. If the amplitude of the input signal from the source 18 is insufficient to maintain the bias voltage at the stable point about which the bias voltage oscillates, then it has been found that the lower frequency oscillations or variations of the bias voltage no longer occur, and so no lower frequency output oscillations appear at the output terminals 20 for this condition.

Fig. 3 shows waveforms, plotted on a common time axis, of voltages present in the frequency divider circuit of Fig. 1 when the circuit is in operation. Curve (*a*) of Fig. 3 shows the waveform of an alternating current signal which the source 18 produces. Curve (*b*) of Fig. 3 shows a waveform of the voltage present across the terminals of the device 10 corresponding to the source signal. The peaks of voltage in curve (*b*) occur during the time that the device 10 is non-conducting, and the lower flat portions are present when the device 10 is conducting. And, curve (*c*) of Fig. 3 shows the instantaneous output signal voltage as it appears across the capacitor 14, and also as it appears after the high frequency component has been filtered or removed. The output signal voltage shown in curve (*c*) shows clearly how the instantaneous amount or magnitude of charge on the capacitor 14 varies or rises and falls, and also shows that the greatest amount of charge (that is, the greatest charge in the direction of reverse bias or less diode conduction) occurs at the same time that the greatest voltage appears across the terminals of the device 10. A comparison of curves (*a*) and (*c*) of Fig. 3 shows that the frequency of the signal across the capacitor 14 is less than the input signal frequency. In the waveforms shown, the frequency of the output signal is one-fifth the frequency of the input signal. Ideally, of course, the instantaneous output signal as it appears across the capacitor 14 is a pure sine wave. However, in practice and as shown in curve (*c*), the shape of the instantaneous output signal across the capactior 14 may have a high frequency component present in it. The shape of the output signal may be improved by applying the output signal to a filter circuit which removes the high frequency component. Or, the output signal may be applied to a vacuum tube or other amplifying device which has a parallel resonant circuit tuned to the frequency of the output signal and connected into the output circuit of the amplifying device. Such an arrangement would isolate the output signal present across the output terminals 20 from the output signal which would be present across the tuned circuit connected in the output circuit of the amplifying device, and would serve to provide an output signal that is substantially a pure sine wave.

Still another way of improving the shape of the output signal is shown in the circuit arrangement in Fig. 4. The circuit arrangement of Fig. 4 is substantially the same as the circuit arrangement shown in Fig. 1, with one exception, namely the use of an inductor 22 in place of the resistor 16. The inductor 22 has a magnitude of such value that it resonates with the capacitor 14 in the region of the lower frequency of the output signal. The operation of the circuit shown in Fig. 4 is believed to be substantially the same as the operation of the circuit shown in Fig. 1, since the inductor 22 forms the equivalent functions of the resistor 16 shown in the circuit diagram of Fig. 1. The output signal is derived across the output terminals 20 which are connected across the capacitor 14.

Figure 5:
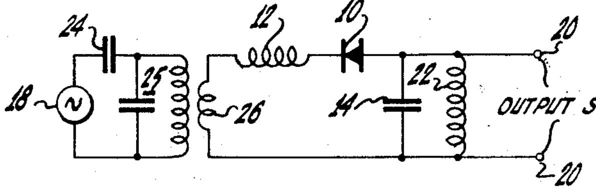
Figure 6:
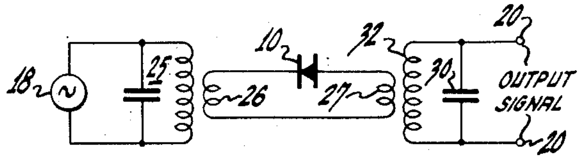
Figure 7:
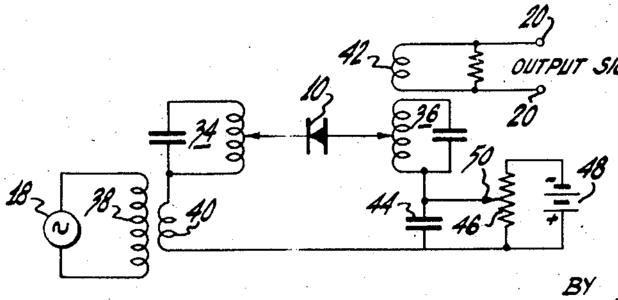

Three other embodiments are shown in the circuit diagrams of Figs. 5, 6, and 7 respectively. An examination of the respective circuit diagrams of Figs. 5, 6, and 7 will show that the frequency divider circuit has the same fundamental components as the circuit diagram shown in Fig. 1, namely, a series circuit having an inductor, a junction diode or device, and effectively a parallel circuit having a capacitor and an inductor or a capacitor and a resistor, and a source of signals.

In Fig. 5, the source 18 is connected into the frequency divider circuit thru a capacitor 24 and a parallel resonant circuit 25 which is tuned to resonate in the region of the frequency of the input signals from the source 18. The source 18 is coupled into the frequency divider circuit thru an inductor 26. The inductor 26 can thus be considered the source of applied signals in series with the device 10. The output oscillations are derived from the output terminals 20 connected across the capacitor 14 and the inductor 22. Or, the output oscillations may be derived from an inductor (not shown) coupled to the inductor 22. The circuit shown in Fig. 5 was built and operated satisfactorily with components having the following values:

| | |
|---|---|
| Source 18 | Ferris signal generator, Model 22A. |
| Capacitor 24 | 39 mmfd. |
| Tuned circuit 25: | |
| Inductor | 64–105 microhenries. |
| Capacitor | 330 mmfd. |
| Inductor 26 | About five turns wound at one end of the inductor of the tuned circuit 25. |
| Inductor 12 | 64–105 microhenries. |
| Device 10 | RCA Experimental SX–104 diode having approximately 80 mmfd. capacity at a reverse bias of 5 volts. The diode had a forward resistance of approximately 1 ohm, and a back resistance of approximately 15 meghoms. |
| Capacitor 14 | 3300 mmfd. |
| Inductor 22 | 500–1000 microhenries. |

With the circuit of Fig. 5 having the above components, the source 18 was set to produce an input signal of one megacycle with a power between 30 and 50 milliwatts. The circuit was easily capable of dividing by a factor of 10 to produce output oscillations of 100 kilocycles at a peak-to-peak voltage of one-half volt across a load of 8,000 ohms connected between the output terminals 20. The waveform of the output oscillations was approximately a sine wave with a remnant of the one megacycle signal imposed on it.

In the embodiment shown in Fig. 6, the source 18 is also coupled into the frequency divider circuit thru the inductor 26. Additional inductance is coupled into the frequency divider circuit thru the input coupling arrangement shown to compensate for the fact that the inductor 12 (shown in Figs. 1, 4 and 5) is omitted. It will be noted that the capacitor 14 (shown in Figs. 1, 4 and 5) is also omitted. However, the necessary capacitance is effectively coupled or introduced in series with the frequency divider circuit thru the inductor 27 which is coupled to a capacitor 30 thru an inductor 32.

Fig. 7 shows a circuit diagram of another embodiment of the invention. In Fig. 7, it will be seen that there are input and output parallel resonant circuits 34 and 36. The input parallel resonant circuit 34 is tuned to resonate in the region of a frequency equal to the difference in the frequencies of the input signal and the output oscillations. The output parallel resonant circuit 36 is tuned to resonate in the region of the frequency of the output oscillations which are lower in frequency than the input signal. The source 18 of input signals is coupled into the frequency divider circuit thru the coupled inductors 38, 40, and the output oscillations are derived from the frequency divider circuit thru an inductor 42 coupled to the inductor of the output parallel resonant circuit 36. The circuit diagram of Fig. 7 differs from the circuit diagrams of Figs. 1, 4, 5, and 6, in that a capacitor 44 is connected in series with the frequency divider circuit in addition to the capacitor in the output parallel resonant circuit 36 which develops the output signal. In certain application, it has been found that a source of bias voltage is helpful and necessary to start the operation of the frequency divider circuit shown in Fig. 7. This source of bias voltage comprises a source of unidirectional potential 48 connected in parallel with a resistor 46. One side of the resistor 46 is connected to one side of the capacitor 44, and a tap or variable arm 50 is connected between the resistor 46 and the other side of the capacitor 44. The source of unidirectional potential 48 is connected so that it tends to bias the device 10 in the reverse bias direction. However, in other applications it has been found desirable to connect the source of unidirectional potential 48 so that it tends to bias the device 10 in the forward direction. When the circuit shown in Fig. 7 was operated, it was found that if the capacitor 44 was shunted by a sufficiently large resistance, the source of unidirectional potential 48 could be removed after operation was initiated, and the bias would then be maintained by the circuit itself. In such cases, a pulse of back-bias exceeding a critical minimum value would also start operation, and a pulse in the opposite polarity or an instantaneous shorting of the capacitor 44 would stop operation. When the resistance presented across the capacitor 44 by the resistor 46 was very high, such as an effective open circuit, it was found that the circuit began operating when the charge applied by the pulse of back-bias leaked off so that the proper bias voltage was reached. When a steady external bias voltage was applied thru a relatively low value of the resistor 46, the critical amount of bias voltage did not change noticeably over a wide range. That is, the bias could be varied as much as 20% in either direction about a value of 5 volts.

Figure 8:
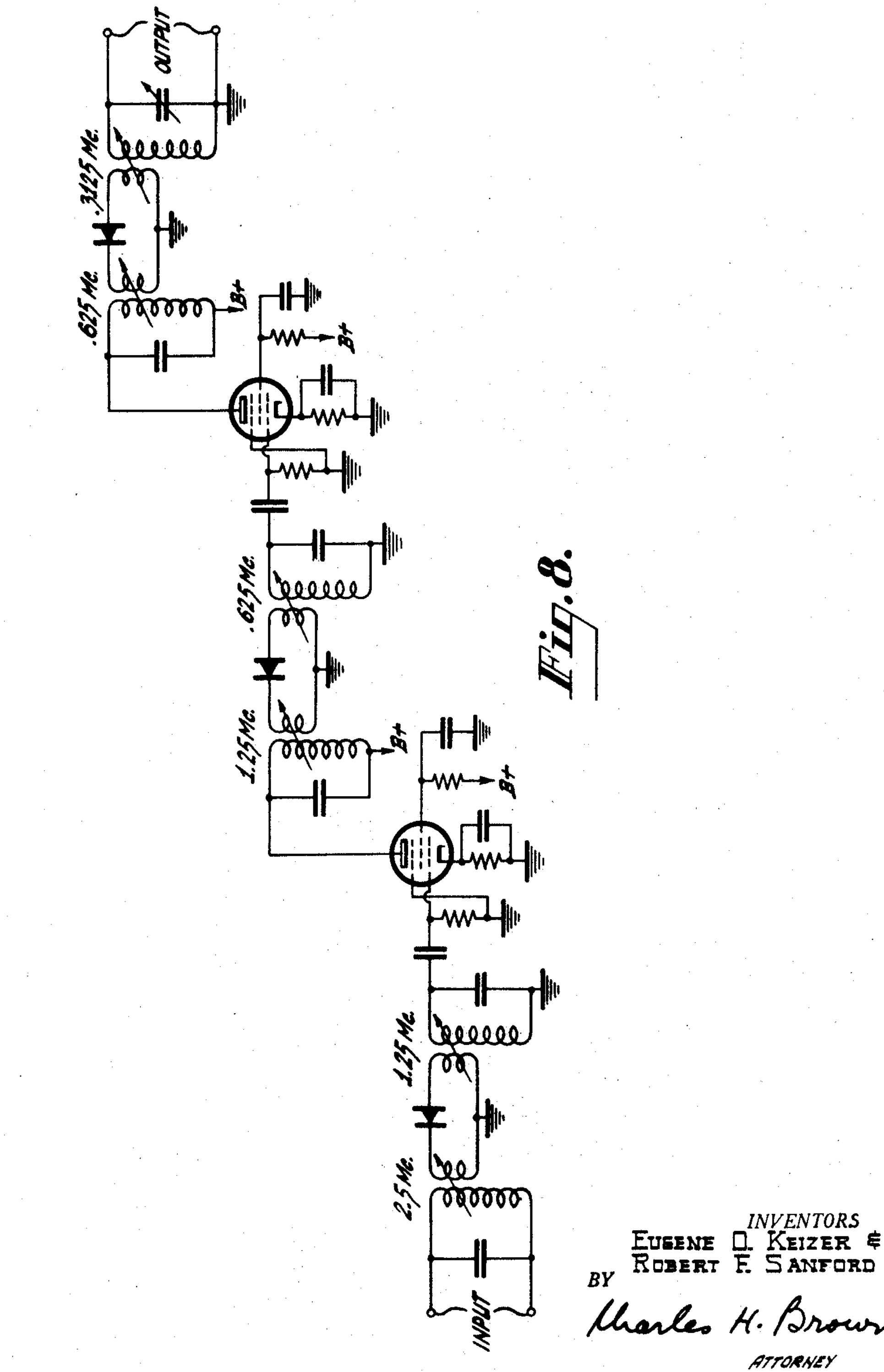

One practical application of the frequency divider circuit built and tested in accordance with the invention is shown in Fig. 8. In this application, it was desired to have a 3-step binary divider which divided an input signal of 2.5 megacycles down to an output signal of 0.3125 megacycle. Basically, the circuit arrangement shown in Fig. 8 comprises three of the circuit arrangements shown in Fig. 6, the three basic circuits being connected in tandem or in series by means of vacuum tubes. Each of the basic frequency divider circuits shown in Fig. 8 divided the frequency of the input signal by two, and it will be seen that with an input signal of 2.5 megacycles, the output oscillations had a frequency that is one-eighth the input signal frequency, or 0.3125 megacycle.

Experiments utilizing the frequency divider circuit in accordance with the invention have shown that a source 18 of rather low impedance produces excellent results. The frequency divider circuit in accordance with the invention is extremely simple, and has the advantage that no direct current power supply is needed, as it is in conventional frequency divider circuits using vacuum tubes. The only source of power needed is the source of signals whose frequency is to be divided. However, it has been found that frequency division factors as high as 20 have been practical, and still maintain locked output oscillations. It has also been found that input signal frequencies as high as 30 megacycles have been satisfactorily divided. However, these figures do not appear to be the upper limit of the frequency divider's capabilities. However, the tightness of locking reduces as the frequency division factor increases. It has also been found that divisions by mixed numbers, such as 3⅓, 4½, or 5¼ for example, could be obtained in addition to division by whole integers, such as 2, 3, etc. Thus, the frequency divider circuit is extremely useful in many applications.

What is claimed is:

1. A frequency divider circuit comprising a junction diode device functioning as a capacitor in shunt with a resistance, an inductor, a parallel circuit comprising a capacitor and an impedance element, means connecting said diode device, said inductor, and said parallel circuit effectively in series to form a series circuit capable of passing direct current, means for applying a signal in series with said series circuit, and means for deriving a signal from said parallel circuit.

2. A frequency changer comprising a junction diode device functioning as a capacitor in shunt with a resistance, a first inductor, a parallel circuit comprising a capacitor and a second inductor, means connecting said diode device, said first inductor, and said parallel circuit in series to form a series circuit capable of passing direct current, means for applying a signal in series with said series circuit, and means for deriving a signal from said parallel circuit.

3. A frequency divider circuit comprising a junction diode device functioning as a capacitor in shunt with a resistance, an inductor, a parallel circuit comprising a capacitor and a resistor, means connecting said diode device, said inductor, and said parallel circuit in series to form a series circuit capable of passing direct current, means for applying a signal in series with said series circuit, and means for deriving a signal from said parallel circuit.

4. A frequency divider circuit that produces an output signal, the energy of which is derived solely from the energy of an input signal, comprising a junction diode device functioning as a capacitor in shunt with a resistance, an inductor, a parallel circuit comprising a capacitor and an impedance device, means connecting said diode device, said inductor, and said parallel circuit in series to form a series circuit capable of passing direct current, means for applying an input signal in series with said series circuit, and means coupled to said parallel circuit for deriving said output signal.

5. A frequency divider circuit that produces an output signal, the energy of which is derived solely from the energy of an input signal, comprising a first inductor, a second inductor, a junction diode device functioning as a capacitor in shunt with a resistance, a parallel resonant circuit comprising a capacitor and a third inductor, means connecting said first inductor, said second inductor, said diode device, and said parallel resonant circuit in series to form a series circuit capable of passing direct current, a second parallel resonant circuit comprising a second capacitor and a fourth inductor, means coupling said fourth inductor to said first inductor, means for applying an input signal across said second parallel resonant circuit, and means coupled to said third inductor for deriving said output signal.

6. A frequency divider circuit that produces an output signal, the energy of which is derived solely from the energy of an input signal, comprising a first inductor, a junction diode device functioning as a capacitor in shunt with a resistance, a second inductor, means connecting said first inductor, said diode device, and said second inductor in series to form a series circuit capable of passing direct current, an input parallel resonant circuit comprising a first capacitor and a third inductor, means coupling said third inductor to said first inductor, means for applying an input signal to said input parallel resonant circuit, an output parallel resonant circuit comprising a second capacitor and a fourth inductor, means coupling said fourth inductor to said second inductor, and means coupled to said output parallel resonant circuit for deriving said output signal.

7. A frequency divider circuit that produces an output signal, the energy of which is derived solely from the energy of an input signal, comprising a junction diode device functioning as a capacitor in shunt with a resistance, a first capacitor, a first inductor, an input parallel resonant circuit comprising a second capacitor and a second inductor, an output parallel resonant circuit comprising a third capacitor and a third inductor, means connecting said diode device, said first capacitor, said first inductor, said input parallel resonant circuit, and said output parallel resonant circuit in series to form a series circuit, a fourth inductor coupled to said first inductor, means for applying an input signal to said fourth inductor, means for applying a source of bias potential across said first capacitor to bias said diode device in the reverse direction, a fifth inductor coupled to said third inductor, and means coupled to said fifth inductor for deriving said output signal.

8. A frequency divider circuit including a first capacitor connected in series with a device functioning as a non-linear capacitor in shunt with a non-linear resistance, means to apply an input signal in series with said device, a load device connected across said first capacitor, and means to derive an output signal from said load device, said circuit producing output signal energy supplied solely from said input signal and of a frequency less than the frequency of said input signal.

9. A frequency divider circuit including a capacitor connected in series with a device functioning mainly as a non-linear capacitive reactance for signal energy flowing in one direction and functioning mainly as a low resistance for signal energy flowing in the opposite direction, means to apply an input signal in series with said device, a load device connected across said first capacitor, and means to derive an output signal from said load device, said circuit producing output signal energy supplied solely from said input signal and of a frequency less than the frequency of said input signal.

10. A frequency divider circuit including a first capacitor, a device functioning as a non-linear capacitor in shunt with a non-linear resistance, an inductor, means connecting said capacitor, said device and said inductor in series to form a series circuit, means for applying input signal energy in series with said series circuit, and a load device connected across said first capacitor to provide a discharge path for said first capacitor, and means to derive an output signal from said load device, said frequency divider circuit producing output signal energy that is supplied solely from said input signal energy and that has a frequency less than the frequency of said input signal energy.

11. A frequency divider circuit including a first capacitor, a device functioning mainly as a non-linear reactance for signal energy flowing in one direction and functioning mainly as a low resistance for signal energy flowing in the opposite direction, an inductor, means connecting said capacitor, said device and said inductor in series to form a series circuit, means for applying input signal energy in the megacycle range in series with said series circuit, a discharge path having impedance connected across said capacitor, and means coupled to said path for producing an output signal, said frequency divider circuit producing output signal energy that is supplied solely from said input signal energy and that has a frequency less than the frequency of said input signal energy.

12. A frequency divider circuit comprising a junction diode device, an inductor, a parallel circuit comprising a capacitor and an impedance element, means connecting said diode device, said inductor, and said parallel circuit in series to form a series circuit capable of passing direct current, means for applying a signal in series with said series circuit, means for applying a biasing potential to said junction diode device, and means for deriving a signal from said parallel circuit.

13. A frequency changer comprising a variable capacitance junction diode, an inductor, a circuit including a real and a reactive impedance, means connecting said diode, said inductor and said circuit effectively in series to form a series circuit capable of passing direct current, means to apply an alternating current signal in series with said series circuit, and means for deriving an output signal from said first-mentioned circuit.

14. A frequency divider circuit that produces an output signal, the energy of which is derived solely from the energy of an input signal, comprising an inductor, a variable capacitance junction diode, a parallel circuit including a capacitor and a resistor, and a source of a single alternating current input signal all coupled in series to form a series circuit capable of passing direct current, and means for deriving an output signal from across said parallel circuit.

15. A frequency divider circuit that produces an output signal, the energy of which is derived solely from the energy of an input signal, comprising a first inductor, a variable capacitance junction diode, a parallel circuit including a capacitor and a second inductor, and a source of a single alternating current input signal all coupled in series to form a series circuit capable of passing direct current, and means for deriving an output signal from across said parallel circuit.

16. A frequency divider circuit comprising a diode device, said device being a variable capacitance semiconductor junction diode, an inductor, a tuned circuit including a capacitive impedance device, means connecting said diode device, said inductor and said tuned circuit in series to form a series circuit capable of passing direct current, means to apply an input signal in series with said diode device, and means to derive an output signal from said tuned circuit.

17. A frequency divider circuit comprising a series resonant circuit including a variable capacitance junction diode, a parallel resonant circuit, means to connect said series resonant circuit and said parallel resonant circuit in series to form a series circuit capable of passing direct current, means to apply energy of a first frequency to said series resonant circuit and to derive energy of a second frequency from said parallel resonant circuit.

18. A frequency changer comprising a series resonant circuit including a variable capacitance semi-conductor junction diode, a parallel resonant circuit, means to connect said series resonant circuit and said parallel resonant circuit in series to form a series circuit capable of passing direct current, means connected in series with said series circuit and including a source of unidirectional potential for applying a biasing potential to said diode, and means to apply signal energy of a first frequency to said series resonant circuit and derive signal energy of a second lower frequency from said parallel resonant circuit.

References Cited in the file of this patent

UNITED STATES PATENTS

| | | |
|---|---|---|
| 2,463,540 | Huge | Mar. 8, 1949 |
| 2,787,755 | Smith | Apr. 2, 1957 |
| 2,829,282 | Hughes et al. | Apr. 1, 1958 |
| 2,879,481 | Muss et al. | Mar. 24, 1959 |